May 22, 1951     W. B. MERKLEY     2,553,929
COMBINATION MOUNT AND COUNTERSHAFT FOR WATCHMAKERS
Filed Feb. 17, 1947     2 Sheets-Sheet 1
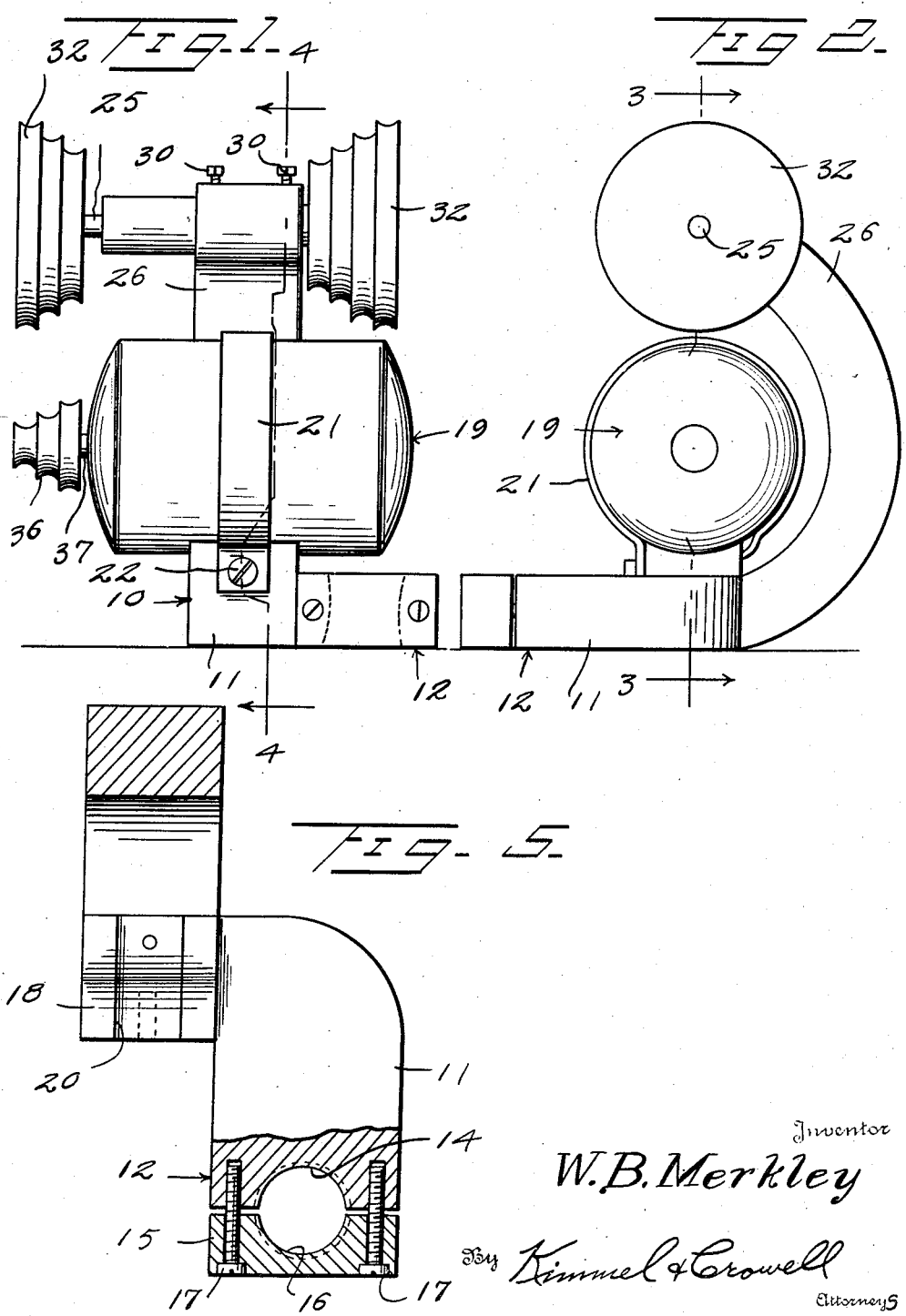

May 22, 1951 W. B. MERKLEY 2,553,929
COMBINATION MOUNT AND COUNTERSHAFT FOR WATCHMAKERS
Filed Feb. 17, 1947 2 Sheets-Sheet 2
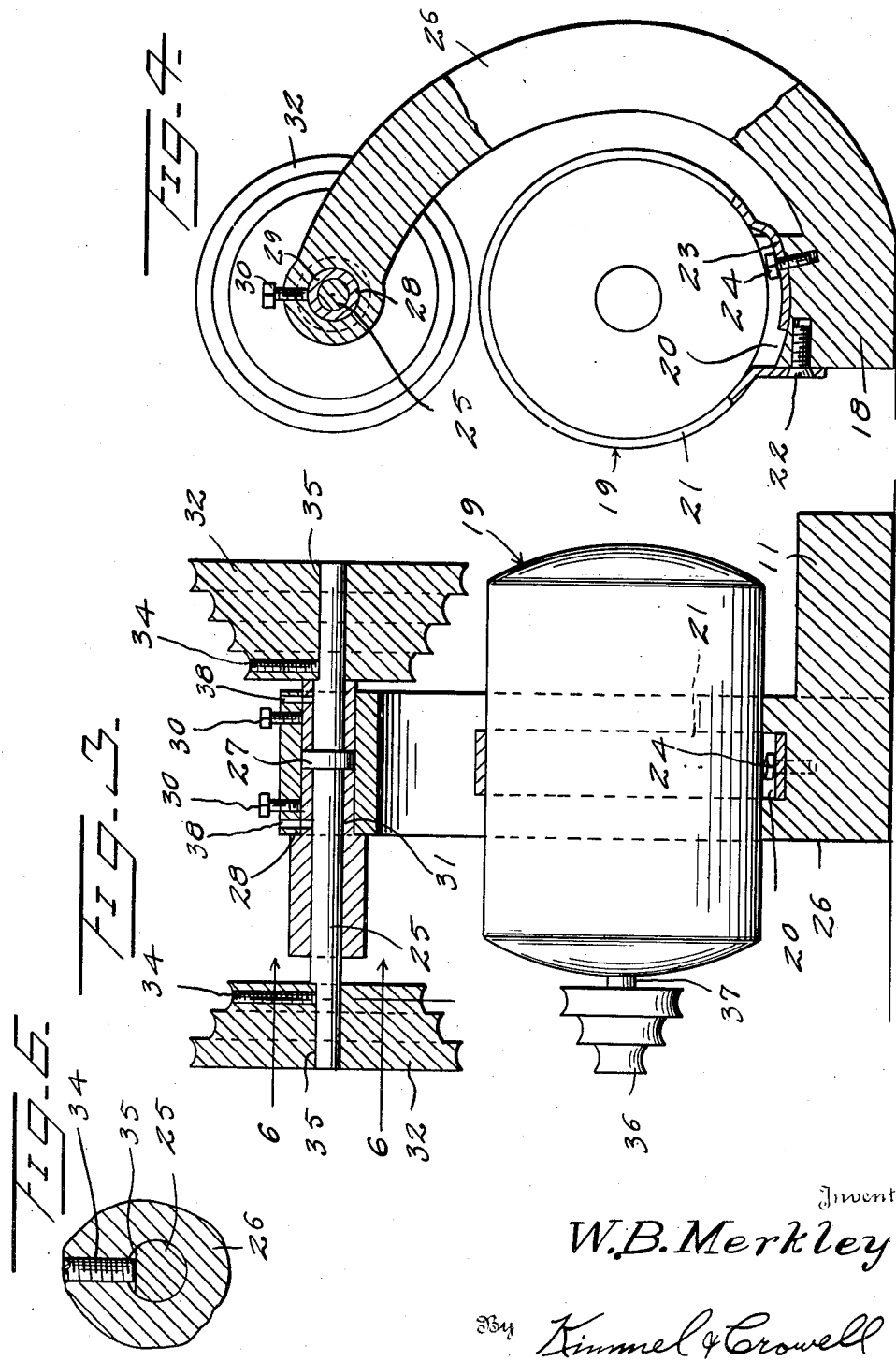
Inventor
W. B. Merkley
By Kimmel & Crowell
Attorneys Patented May 22, 1951

2,553,929

UNITED STATES PATENT OFFICE 2,553,929

COMBINATION MOUNT AND COUNTERSHAFT FOR WATCHMAKERS

Woodrow B. Merkley, Price, Utah

Application February 17, 1947, Serial No. 729,020

1 Claim. (Cl. 248—19)

This invention relates to a combination motor mount and countershaft designed particularly for use on a watchmaker's lathe.

It is an object of this invention to provide a mount which will provide for the integral mounting of a motor and countershaft on a lathe in order to support the motor in close proximity to the lathe whereby the vibration of the assembly will be reduced to a working minimum value.

Another object of this invention is to provide a motor mount of the kind to be more specifically described hereinafter, so constructed and arranged that the motor and countershaft will be mounted on the lathe so that the entire assembly may be pivoted about the pivot provided on the lathe, thereby increasing the effective range of pivotal movement of the lathe relative to the bench on which it is supported.

With the above and other objects in view, my invention consists in the arrangement, combination and details of construction disclosed in the drawings and specification, and then more particularly pointed out in the appended claim.

In the drawings,

Figure 1 is a front elevation of a combined motor mount and countershaft constructed according to an embodiment of this invention, Figure 2 is a side elevation, Figure 3 is a vertical section taken on the line 3—3 of Figure 2, Figure 4 is a vertical section taken on the line 4—4 of Figure 1, Figure 5 is a top plan view, partly broken away and partly in section, of a motor mount with the countershaft and motor removed, Figure 6 is a fragmentary detailed section taken on the line 6—6 of Figure 3.

Referring to the drawings, the numeral 10 designates generally a combination motor mount and countershaft for use particularly with a watchmaker's lathe. Such lathes are usually constructed for pivotal movement about one end thereof. Various means have been provided for rotating the driving shaft on the lathe, such means usually consisting of flexible cables from a countershaft or motor disposed below the lathe and bench on which the lathe is supported.

The motor mount of this invention is adapted to be secured to the lathe itself near or at the point of pivotal movement so that the motor and driving means connecting the motor to the lathe will be pivoted together with the lathe. In this manner the vibration of the lathe previously caused by the shaking of the lathe and the bench by the motor and driving means suspended below it are done away with and the whole assembly is formed as a compact unit.

The motor mount is adapted to be made of metal or other suitable material. The motor mount 10 comprises a base portion 11 which is substantially flat and rectangular, having a clamping member 12 formed on or fixed to the front end thereof. A part of the clamping member 12 is formed on the base by providing the forward end of the base with a semi-circular cutout 14 at the front edge thereof, and the clamping jaw 15 also having a correlated semi-circular cutout 16, is adapted to be secured to the front end of the base by bolts 17 or other suitable fastening devices. The clamping member 12 is adapted to be clamped about a vertical pivot member of the lathe.

The rear end of the base 11 is formed with a laterally extending portion 18, the upper end of which is arcuate for receiving and supporting a motor 19 thereon. The section 18 is formed along its length with a central groove 20 within which one end of a strap 21 is adapted to engage. The strap 21 is fixed at one end to the forward side of the base extension 18 by a bolt 22, then the strap is encircled about the motor, having the other end 23 of the strap engaging in the slot 20. The end 23 of the strap may also be slotted for adjusting the strap about the motor, and a bolt 24 through the slotted end of the strap secures the strap and motor to the base section 18.

A countershaft 25 is supported above the motor 19 by an upwardly extending arcuate arm 26. The arm 26 is preferably formed together with the base 11, and the motor 19 is adapted to be disposed on the forward concave side of the arm 26. The countershaft 25 is formed with an annular rib 27 intermediate the length thereof, which rib is slidably engaged in an opening 28 across the upper end of the arcuate arm 26.

A short length of bearing, as 29, is disposed about the countershaft 25 within the opening 28 of the arm, to provide a bushing or bearing for the countershaft. The bearing 29 is secured in position by a set screw 30 engaging through the arm 26. The rib 27 is adapted to abut the inner end of the bearing 29 and a second bearing 31 is carried about the countershaft within the opening 28 on the opposite side of the rib 27.

A set screw 30 secures the opposite bearing member 31 on the opposite side of the rib 27, for holding the countershaft against lateral movement relative to the arm 26.

Suitable pulleys are fixed on the countershaft outwardly of the arm 26 on both sides thereof, and the pulleys 32 are fixed on the countershaft by set screws 34 which engage through the pulleys and the flat surface 35 on each end of the countershaft 25. Other pulleys as 36 are secured on the drive shaft 37 of the motor 19, and a suitable flexible member not shown, will be used to connect the pulleys 32 to the pulleys 36 as selected, for driving the countershaft and pulleys from the motor.

The motor will drive the pulleys on one side of the arm 26 and the pulleys on the other side will be connected to the correlated pulleys on the lathe.

For lubricating the countershaft 25, I have provided holes 38 through the arm 26 and bearing 29, whereby suitable oil may be applied to the shaft 25 in the bearing 29.

I do not mean to confine myself to the exact details of construction herein disclosed, but claim all variations falling within the purview of the appended claim.

What I claim is:

A combined motor and countershaft support comprising a base, a strap fixed at one end on said base for securing a motor on said base, said strap formed with a longitudinal slot on the other end, a bolt on said base engaging in said slot for adjustably fixing said strap about said motor, an upwardly extending arcuate arm on said base, and means securing a countershaft on said arm above said motor.

WOODROW B. MERKLEY.

REFERENCES CITED

The following references are of record in the file of this patent:

UNITED STATES PATENTS

| Number | Name | Date |
| --- | --- | --- |
| 2,090,818 | Stanley | Aug. 24, 1937 |
| 2,278,216 | Rich | Mar. 31, 1942 |
| 2,282,699 | Black | May 12, 1942 |